(No Model.)
C. N. SHAW.
BUTTER CUTTER.
No. 458,195. Patented Aug. 25, 1891.
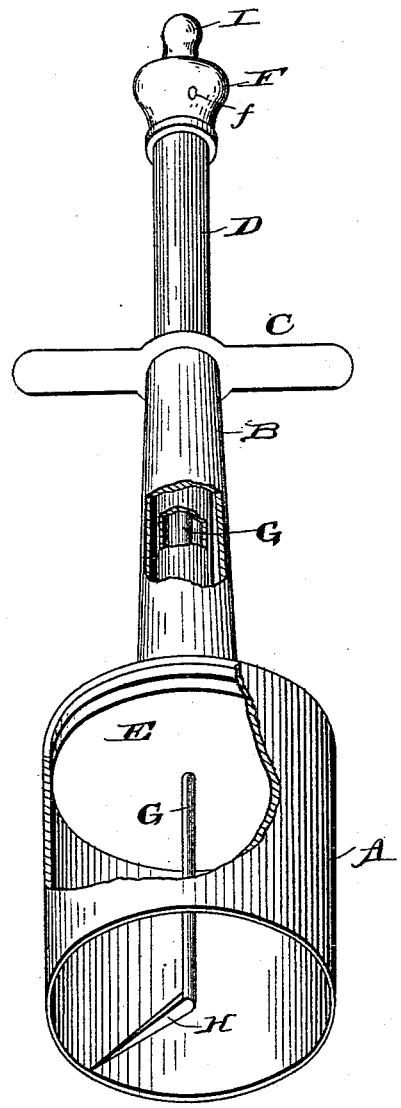
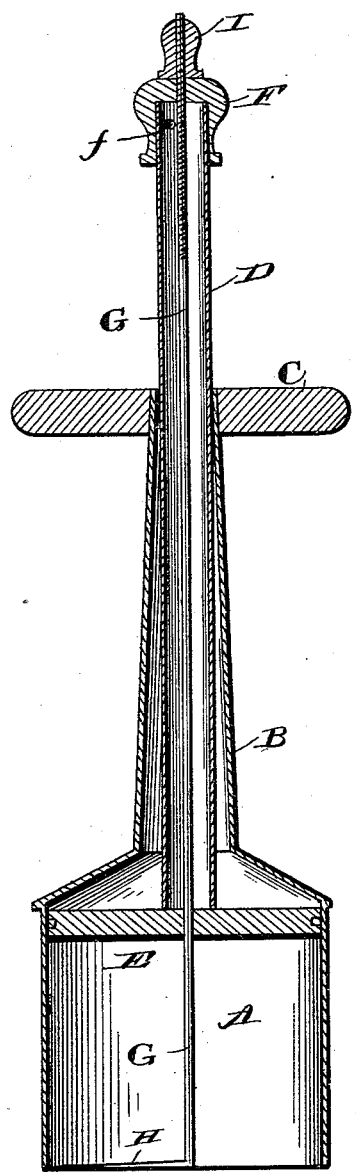
Fig. 1.
Fig. 2.
WITNESSES
A. J. Schwartz
George E. Reily
INVENTOR
Charles N. Shaw
J. Fred. Reily
Attorney

UNITED STATES PATENT OFFICE.

CHARLES N. SHAW, OF PETOSKEY, MICHIGAN.

BUTTER-CUTTER.

SPECIFICATION forming part of Letters Patent No. 458,195, dated August 25, 1891.

Application filed October 25, 1890. Serial No. 369,361. (No model.)

*To all whom it may concern:*

Be it known that I, CHARLES N. SHAW, a citizen of the United States, residing at Petoskey, in the county of Emmet and State of Michigan, have invented certain new and useful Improvements in Butter-Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists in a new and improved butter-cutter, for handling butter, lard, &c., being an improvement on the invention for which Letters Patent No. 431,921 were granted to me, bearing date of July 8, 1890; and my new and improved scoop will be hereinafter fully described and claimed.

Referring to the accompanying drawings, Figure 1 is a perspective view of my new and improved scoop, showing the plunger pushed up to the top of the scoop-body and the blade of the cutter-rod pressed down to the bottom of the scoop, to cut off the desired quantity of butter, parts of the device being broken away to better illustrate the construction of the several parts; and Fig. 2 is a longitudinal central sectional view of the entire device.

The same letters of reference indicate corresponding parts in both the figures.

Referring to the several parts by letter, A indicates the cylindrical body of the scoop, having the top $a$, from which extends the hollow handle B. This handle I provide at its upper end with a cross-handle C, for the purpose which will be hereinafter described. Through the hollow handle B and a central opening in the cross-handle C passes a piston-rod D, to the lower end of which the plunger E is attached, the piston-rod having at its upper end a knob F, for convenience in handling it, this knob being held in place by a pin $f$. Through the center of the plunger, the piston-rod, and the knob F passes the cutter-rod G, which, as shown, is longer than the piston-rod, and has at its lower end a cutting-blade H, extending at right angles from the lower end of the cutter-rod out to the edge of the plunger. The upper end of the cutter-rod is threaded, and upon this threaded upper end screws a small knob I.

In operation, the scoop A is pressed down into the tub or mass of butter, which presses the plunger E up to the top of the scoop-body, and when the scoop is full the cutter-rod G is pushed down and the blade H turned around once at the bottom of the scoop, thus separating the butter in the scoop from the mass in the tub. The cutter-blade, which, as shown, extends from the lower end of the cutter-rod out to one side of the scoop only, is then drawn up, and the scoop is turned around by means of the cross-handle C, so as to free the sides of the scoop from the mass of butter, when the scoop can be readily lifted out with the butter contained in it. The plunger is then pushed down to the bottom of the scoop, and the cutter-rod G, with its blade against the lower face of the plunger, turned around once, thereby cutting the butter loose from the bottom of the plunger.

My scoops can be made in any size, but are preferably made in two sizes, one to contain one pound of butter and another size, one-half as small, to contain one-half pound.

The object of threading the upper end of the cutter-rod is that when the dealer is to weigh the butter in a wooden dish and wishes to obtain pay for the dish which he furnishes, he can turn the knob I to raise the cutter-rod and blade slightly, thereby cutting off enough less than a pound to make the wooden dish and the butter together weigh a pound. The cutter-rod can also be raised by turning the knob I so as to cut off a one-half-pound roll in the pound scoop when desired.

By means of the adjustable knob I and the screw-threaded rod, the blade at the lower end of the rod can be adjusted, and the scoop can then be operated without further trouble or attention until it is desired to change it again, which can easily be done by turning the knob upon the screw-threaded portion of the rod. As the knob is pushed down until it rests against the top of the handle or hollow piston-rod, or rather upon the knob on top of it, the blade is caused to pass around within the scoop, without any deviation up or down, as the pressure of the hand upon the knob will prevent the blade from rising, and the knob resting upon the top of the handle will prevent it from going in the opposite direction. Thus the device can be operated without even looking at it—as, for instance, in going into a dark cellar or room where the butter can be kept to keep it cool.

By removing the knobs F and I the several parts can be readily taken apart to clean them.

Having thus described my invention, what I claim, and desire to secure by Letters Patent, is—

In a butter-cutter, the combination, with a body having a hollow handle rising from its top and provided with a cross-handle at the upper end, a piston, the plunger of which is in the scoop and perforated and the rod or handle of which is hollow and passes up through the scoop-handle and is provided with a perforated knob upon its upper end, a cutter-rod through the piston and the cap at its upper end, the lower end of which rod is provided with a laterally-extending blade and the upper end is screw-threaded, and an adjustable knob upon the upper end of the cutter-rod, whereby the position of the blade relatively to the plunger and of the lower edge of the scoop may be adjusted as desired, substantially as described.

In testimony whereof I affix my signature in presence of two witnesses.

CHARLES N. SHAW.

Witnesses:
HENRY A. EASTON,
C. L. TOUSLEY.